April 10, 1951 C. W. SINCLAIR 2,548,627
RIM
Filed April 7, 1947 2 Sheets-Sheet 1
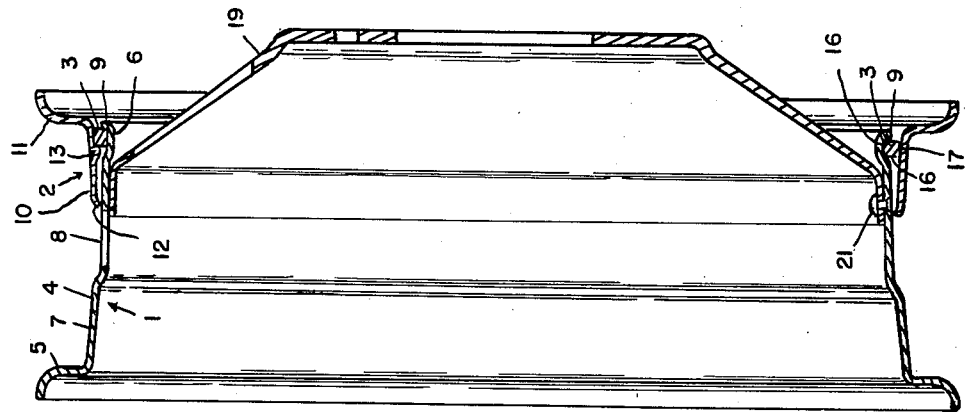
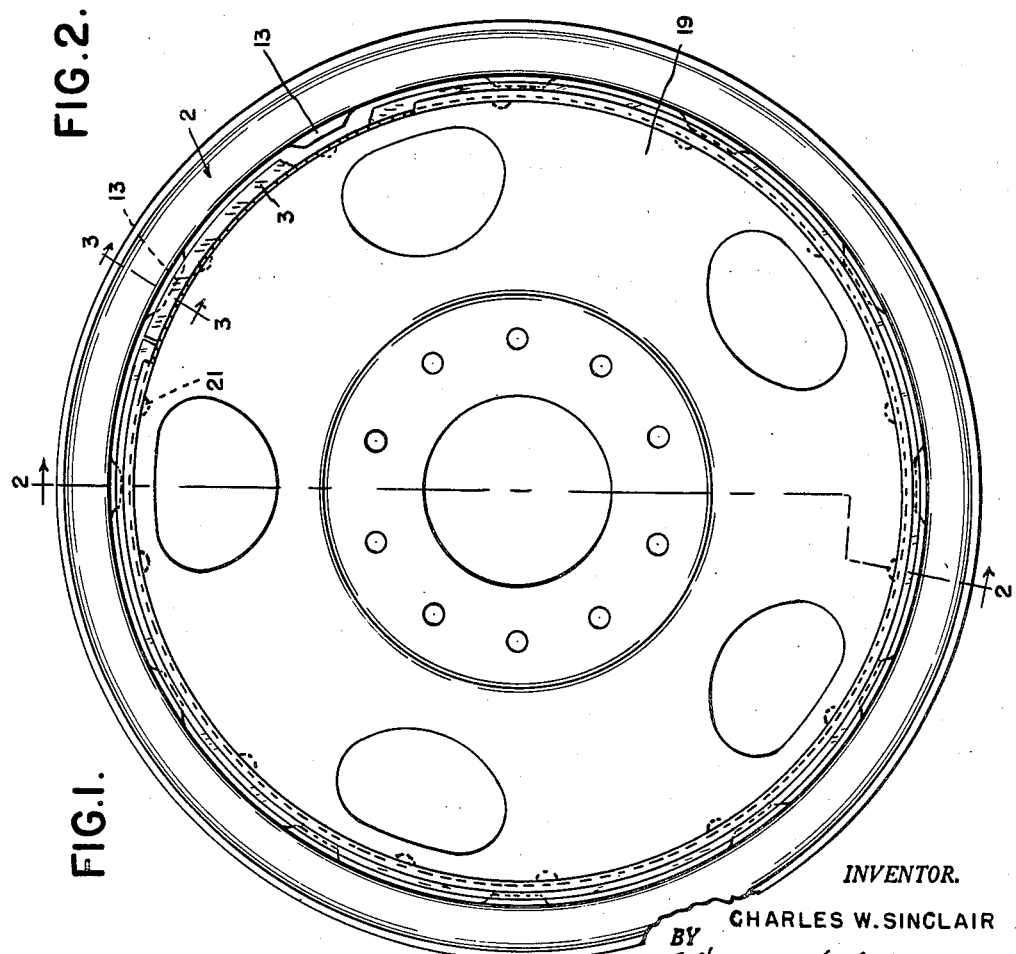
INVENTOR.
CHARLES W. SINCLAIR
BY
*Whittemore Hulbert Belknap*
ATTORNEYS

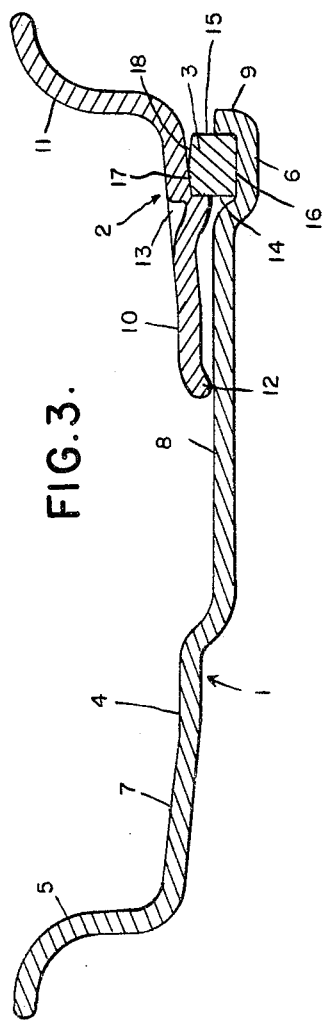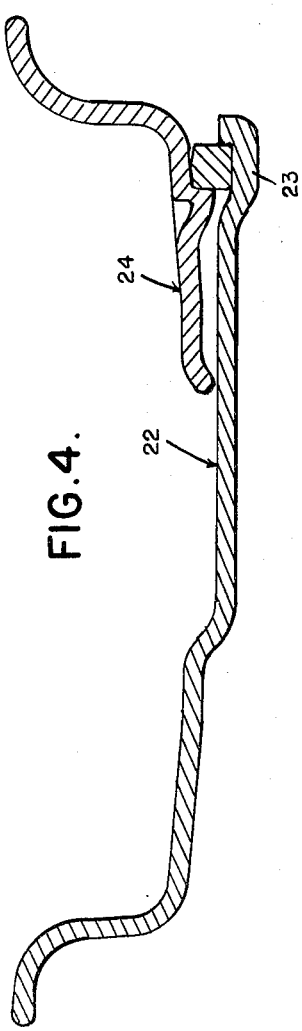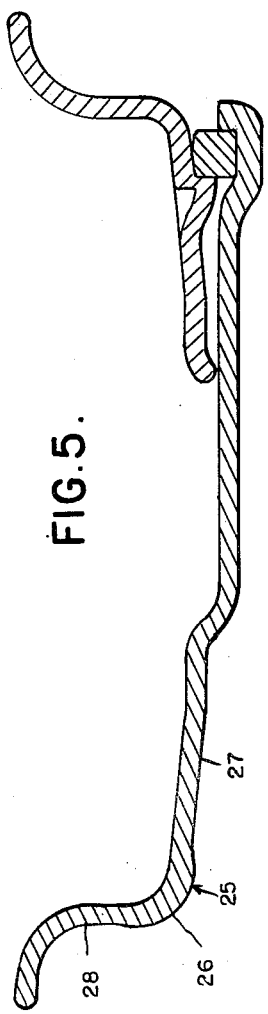

Patented Apr. 10, 1951

2,548,627

UNITED STATES PATENT OFFICE 2,548,627

RIM

Charles W. Sinclair, Detroit, Mich., assignor to Kelsey-Hayes Wheel Company, Detroit, Mich., a corporation of Delaware Application April 7, 1947, Serial No. 739,773

4 Claims. (Cl. 152—410)

The invention relates to rims and refers more particularly to pneumatic tire carrying rims of that type employing an endless base member, a detachable endless tire retaining member and a detachable transversely split clamping ring member.

The invention has for one of its objects to provide an improved rim having its base and tire retaining members formed from flat stock and constructed to facilitate mounting and demounting of the tire and to effectively retain the tire when mounted on the rim in inflated condition.

The invention has for another object to provide an improved rim in which the grain extends transversely of each of the base and tire retaining members and more particularly of the bends in each of the members to thereby increase the strength and decrease liability of fracture.

With these as well as other objects in view, the invention resides in the novel features of construction and combinations and arrangements of parts as are more fully hereinafter set forth.

In the drawings:

Figure 1 is an elevation of a wheel having a rim embodying the invention;

Figure 2 is a cross section on the line 2—2 of Figure 1;

Figure 3 is an enlarged cross section on the line 3—3 of Figure 1; and

Figures 4 and 5 are views similar to Figure 3 showing modifications.

In general, the rim is a pneumatic tire carrying rim forming part of a motor vehicle wheel. The rim illustrated in Figures 1, 2 and 3 comprises the annular base member 1, the detachable tire retaining member 2 encircling the base member and the detachable clamping ring 3 for holding the tire retaining member on the base member.

The base member 1 is formed of sheet metal, and more particularly sheet steel, from flat stock of substantially uniform thickness and has the grain of the metal extending transversely of the periphery. The base member is endless and has the annular base 4 and the integral annular tire retaining flange 5 extending generally radially outwardly from one edge of the base. The base is formed with the integral annular gutter 6 at the edge remote from the tire retaining flange and with the annular portions 7 and 8 of different diameter, the annular portion 7 being of greater diameter and being flared toward the tire retaining flange to form a flared tire bead seat portion connecting into the tire retaining flange. The annular portion 8, of less diameter than the annular portion 7, extends between the annular portion 7 and the gutter 6. The gutter terminates in the annular substantially radial wall 9 presenting a substantially radial surface facing axially inwardly. The wall has an external diameter preferably slightly less than the external diameter of the annular portion 8.

The tire retaining member 2 is formed of sheet metal, and more particularly sheet steel, from flat stock of substantially uniform thickness and has the grain of the metal extending transversely of the periphery. The tire retaining member is endless and has the axially outwardly flared tire bead seat portion 10 and the integral tire retaining flange 11 extending generally radially outwardly from the axially outer edge of the tire bead seat portion. The tire bead seat portion has the radially inturned axially inner edge 12 and is provided intermediate its edges with the annular series of generally radially inwardly extending depressions 13 presenting an annular series of substantially radial shoulders facing axially outwardly. The internal diameter of the inturned edge and the diametral distance between the radially inner faces of the depressions are slightly greater than the external diameter of the annular portion 8 so that the tire retaining member may be moved axially inwardly over the annular portion. The portion of the radially inner surface of the tire bead seat portion 10 axially outwardly of the depressions 13 flares axially outwardly to form a flared surface for radial wedging engagement with the clamping ring 3.

The clamping ring 3 is transversely split at one point and is formed of spring metal. This ring has a section with the radially extending axially inner and outer surfaces 14 and 15 respectively, the axially extending radially inner surface 16 and the flared radially outer surfaces 17 and 18 which are inclined radially outwardly from the axially inner and outer surfaces at the same angle as the flared radially inner surface of the tire retaining member for contacting or engaging the clamping ring. The clamping ring construction is such that it is symmetrical with respect to its axially central radial plane so that the clamping ring is reversible. The clamping ring has an axial thickness which is less than the axial width of the gutter so that the gutter may readily accommodate the clamping ring. Also, the clamping ring has radial dimensions which are greater than the normal radial distances between the radially facing surfaces of the gutter and tire retaining member engaged by the clamping ring so that when the tire retaining member and the clamping ring are in their normal or operative positions relative to the base member with the clamping ring abutting the axially outer wall of the gutter and the depressions of the tire retaining member, the clamping ring exerts radial pressure on both the base member and the tire retaining member and flexes either or both.

With the construction as illustrated, the tire retaining member is made more strongly resistant to radial flexure than the base member so that the tire retaining member maintains its dimensions and acts through the clamping ring to compel flexure of the base member axially outwardly of its zone of connection with the wheel body 19 which, as illustrated, is a tapered disk having the axially extending peripheral flange 20 secured to the annular portion 8 of the base member by suitable means such as the rivets 21.

With this construction of rim, the tire may be readily and easily mounted on the base member 1 of the rim during which time the tire retaining member 2 and the clamping ring 3 are removed. The tire retaining member may then be readily mounted on the base member and inserted within the axially outer bead of the tire casing and while the tire retaining member is in an axially inner position to clear the clamping ring, the latter may be inserted into the gutter 5 with the surface 15 engaging the axially outer wall 9 of the gutter. The tire retaining member may then be moved to its axially outer position over the clamping ring by inflation of the inner tube of the tire, this position being positively and definitely determined by contact of the shoulders upon the depressions of the tire retaining member abutting the clamping ring, the latter being positively and definitely positioned by reason of its abutment with the wall 9. During the axially outward movement the tire retaining member exerts a radial wedging action on the clamping ring and axial pressure exerted by the tire is partially converted into radial pressure exerted by the clamping ring and when the tire retaining member is definitely axially positioned a solid radial connection is in effect formed between the base member, the clamping ring and the tire retaining member.

By reason of the grain of the metal forming the base member and tire retaining member extending transversely of the periphery of each of these members, liability of the base member and tire retaining member shearing at the bends is greatly reduced and this is especially important at the junctions of the tire bead seat portions and tire retaining flanges and the junction of the axially inner side wall of the gutter and the adjacent portion of the base member and also in the gutter itself.

Figure 4 illustrates a modification of rim which is of the same general construction and is formed in the same manner as the rim in Figures 1, 2, and 3 with the exception that the annular base member 22 has its gutter 23 and the portion of the base member adjacent the gutter upset and of greater thickness than the thickness of the flat stock from which the base member is formed. By reason of the increased thickness, the gutter and the adjacent portion of the base member, and more particularly, the axially inner wall of the gutter are reinforced to better withstand the stresses to which the parts are subject during operation of the rim. With this construction the tire retaining member 24 is subjected to greater radial stress which may be sufficient, depending upon the gage of the flat stock from which the tire retaining member is formed, to flex the tire retaining member by slightly increasing its diameter and particularly its bead seat portion having the flared radially inner surface engaged by the clamping ring.

Figure 5 illustrates another modification of rim which differs from the rim of Figure 4 in that the annular base member 25 is also upset and of greater thickness at the bend 26 forming the juncture between the bead seat portion 27 and the tire retaining flange 28.

In the manufacture of the endless annular base member, a blank is first formed from flat metal strip stock of uniform thickness, such as strip sheet steel, with the grain of the metal extending transversely of the length of the blank. The blank is hooped and its ends welded together after which it is trimmed to remove the weld flash, the resulting blank being cylindrical having its grain extending axially. Then if the base member 22 of Figure 4 is being formed an edge portion of the hooped welded blank is upset by axial pressure. In the event that the base member 25 of Figure 5 is being formed, another portion of the hooped welded blank in addition to the upset edge portion is upset. The plain, the singly upset and the doubly upset hooped welded blanks are then formed by suitable steps of die-pressing, rolling, expanding and finally shrinking to form the base members of Figures 1, 2 and 3, 4 and 5.

In the manufacture of the endless tire retaining member, a blank is first formed from flat metal strip stock of uniform thickness, such as sheet steel, with the grain of the metal extending transversely of the length of the blank. The blank is hooped and its ends welded together after which it is trimmed to remove the weld flash, the blank at the end of these steps having its grain extending axially. The blank is then formed by suitable steps of die-pressing, rolling, expanding, punching to form the depressions, and finally shrinking to form the tire retaining member of Figures 1, 2 and 3, 4 and 5.

In the manufacture of the clamping ring, mill section stock preferably of spring metal in the nature of straight rods of indeterminate length, is cut to length and coiled to form the clamping ring of Figures 1, 2 and 3, 4 and 5.

The method of manufacture is more fully described in my co-pending application Ser. No. 742,850 filed April 21, 1947, now abandoned.

What I claim as my invention is:

1. A rim comprising an endless sheet metal annular base member having an annular gutter at one edge terminating in an annular wall presenting a substantially radial surface, a detachable endless sheet metal tire retaining member encircling said base member and having an annular series of angularly spaced generally radially inwardly extending hollow depressions presenting an annular series of substantially radial shoulders and a transversely split clamping ring member extending within said gutter and located between said base and tire retaining members and abutting said surface and shoulders, said gutter, tire retaining member, and clamping ring member when in operative position having generally radially facing contacting surfaces and said clamping ring member having radial dimensions greater than the normal radial distances between the radially facing contacting surfaces of said gutter and tire retaining member and exerting radial pressure on said base and tire retaining members.

2. A rim comprising an endless annular base member formed from flat stock and having an annular gutter at one edge terminating in an annular substantially radial wall, said gutter being upset and of greater thickness than the thickness of the flat stock, a detachable endless tire retaining member formed from flat stock and encircling said base member and having an annular series of angularly spaced generally radially inwardly extending hollow depressions presenting an annular series of substantially radial shoulders and a transversely split clamping ring member extending within said gutter and located between said base and tire retaining members and abutting said wall and shoulders, said clamping ring member when in operative position having radial wedging engagement with one of said base and tire retaining members and exerting generally radial pressure against said base and tire retaining members.

3. A rim comprising an endless annular base member formed from flat stock and provided with an annular wall presenting a substantially radial surface, a detachable endless tire retaining member formed from flat stock and encircling said base member and having an annular series of angularly spaced generally radially inwardly extending hollow depressions presenting an annular series of substantially radial shoulders and a transversely split clamping ring member located between said base and tire retaining members and abutting said surface and shoulders, said base, tire retaining and clamping ring members when in operative position having generally radially facing contacting surfaces and said clamping ring member having radial dimensions greater than the normal radial distances between the radially facing contacting surfaces of said base and tire retaining members and exerting radial pressure on said base and tire retaining members.

4. A rim comprising an endless annular base member provided with an annular substantially radial wall, a detachable endless sheet metal annular tire retaining member having its grain extending transversely, said tire retaining member encircling said base member and having an annular series of angularly spaced generally radially inwardly extending hollow depressions presenting substantially radial shoulders in substantially the same plane and a transversely split clamping ring member located between said base and tire retaining members and abutting said wall and shoulders, said clamping ring member having radial dimensions greater than the normal radial dimensions between the portions of said base and tire retaining members engaged by said clamping ring member and exerting radial pressure thereon.

CHARLES W. SINCLAIR.

REFERENCES CITED

The following references are of record in the file of this patent:

UNITED STATES PATENTS

| Number | Name | Date |
|---|---|---|
| 685,174 | Renard | Oct. 22, 1901 |
| 853,058 | Bryant | May 7, 1907 |
| 1,419,170 | Putnam | Jan. 13, 1922 |
| 2,434,180 | Sinclair | Jan. 6, 1948 |